United States Patent
Isernia et al.

(10) Patent No.: US 6,559,961 B1
(45) Date of Patent: May 6, 2003

(54) ELECTRONIC PRINTING OF PRINT JOBS CONTAINING JAM-PRONE SHEETS

(75) Inventors: Robert J. Isernia, Fairport, NY (US); James S. Stoll, Wolcott, NY (US); Richard E. Nearpass, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,117

(22) Filed: Sep. 27, 1999

(51) Int. Cl.[7] .............................................. G06K 15/00
(52) U.S. Cl. ..................... 358/1.14; 358/1.12
(58) Field of Search ..................... 358/1.1, 1.5, 1.12, 358/1.13, 1.14, 304, 498; 399/9, 11, 14, 15, 16, 18, 19, 397, 402; 270/1.01; 271/3.13, 259

(56) References Cited

U.S. PATENT DOCUMENTS 3,603,585 A * 9/1971 Maloney et al. ............ 271/259
4,275,879 A * 6/1981 Yamashita et al. .......... 271/259
5,489,969 A   2/1996 Soler et al. ................. 355/207
5,946,641 A   8/1999 Morys ......................... 702/91

FOREIGN PATENT DOCUMENTS

CA           2215766        4/1998

* cited by examiner

Primary Examiner—Arthur G. Evans

(57) ABSTRACT

In electronic collated printing of an electronic document of plural electronic pages with a printer printing normal sheets with a normal jam rate but printing abnormal printing sheets with a substantially higher jam rate, where associated with the electronic pages is printing sheet selection information, there is provided here electronic separation of the electronic pages of the document which specify the abnormal printing sheets. The system then prints those separated pages onto their abnormal printing sheets prior to printing any of the other electronic pages, temporarily holds them in an interposer, then prints the other pages of the document onto normal sheets, and provides collated merging in the interposer to provide collated output of the entire electronic document.

6 Claims, 2 Drawing Sheets

ELECTRONIC PRINTING OF PRINT JOBS CONTAINING JAM-PRONE SHEETS

Figure 1:
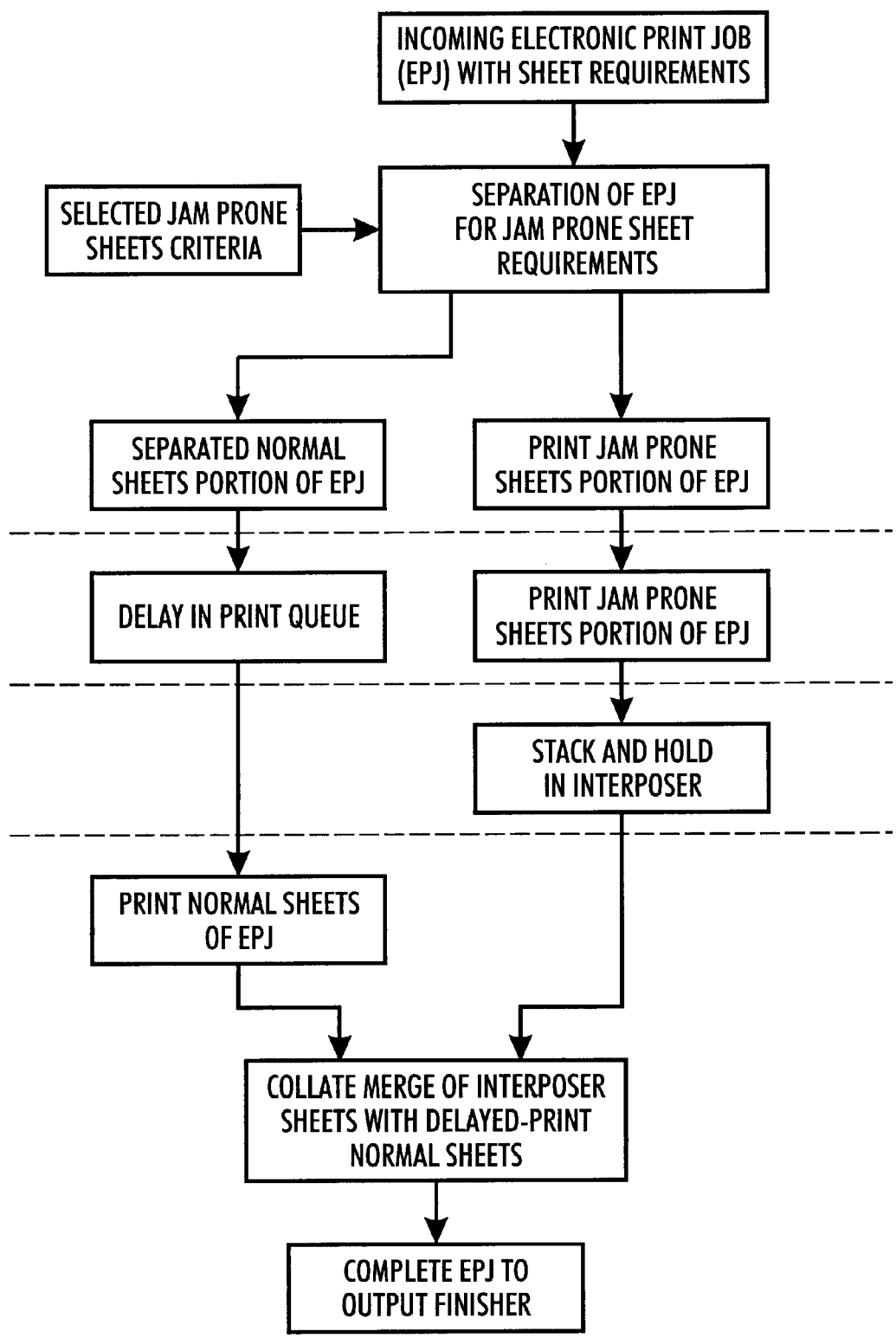

In the xerographic reproduction and other printing arts, especially where a print job is a large, multi-page document, or a large number of copies of a plural page document, it is well known that frequent paper jams and job recoveries can result in reduced productivity, operator frustration, and having to discard many sheets of print jobs which are only partially completed when the jams occurred. It is also well known in the printing art that certain types of image substrate sheets being printed in a printer are substantially more prone to jams than normal printing sheets such as standard letter or legal size paper of normal weights. Examples of more jam prone sheets include very large sheets, heavy card stock sheets, tabbed sheets, special cover sheets, special coated paper sheets, transparencies, etc.. These more jam prone sheets require far more frequent printer stoppages, jam clearances, and job recoveries. Often, such special, more jam prone, sheets are only a few pages of a document which is otherwise being printed on normal copy sheets, yet the printing of the entire document is interrupted, and several pages of each document copy sheet may have to be cleared out of the print engine, discarded, and reprinted. It is a feature of the disclosed system herein to reduce many of the above-described and other problems.

In the disclosed embodiment, as an electronic print job document comes in to the print server or other electronic input for an electronic printer for printing, the pages of that document specifying more jam prone sheets may be electronically identified and electronically separated or "pulled" from the normal print order print queue. Those special, more jam-prone, sheet page requirements may be identified from the job ticket, PDL, or other special print stock instructions or indicia. Or, in some cases, they may be identified from a paper supply drawer designator (of a drawer in which special paper or card stock is loaded). These automatically electronically pulled jam prone pages are then printed first, separately, out of order, so that they can be better supervised, and so as not to require throwing away other (normal) printed sheets in job recoveries to clear jams. These special sheets are fed into an interposer or other intermediate tray(s) (intermediate the printer output) for subsequent insertion. Thus, if a jam occurs due to a special sheet, only some of these special sheets need to be purged and reprinted, not the entire, or a large proportion of, the multi-page document set or sets. Then, after the jam-prone sheets have been printed and temporarily stored in the interposer, the rest of that same print job, which is less jam prone, is printed. That is, the text pages being printed on standard weight, standard size, paper, are then printed, and then collation is reestablished (to provide complete collated sets of the print job) by interposing (inserting) the previously printed sheets from the interposer tray(s) into the print job stream of the printer at the page positions from which they were electronically removed. Properly collated complete print job documents may thus be normally sent on for output and/or finishing.

Note that this should be distinguished from the prior use of interposers (noted below) to interpose preprinted sheets previously printed separately, on a separate printer or otherwise, which requires special programming instructions for each insert.

By way of background on "interposers" (sheet inserters) for printers there is noted, for example, Xerox Corp. U.S. Pat. No. 5,489,969 issued Feb. 6, 1996 to J. J. Soler, et al., and U.S. Pat. No. 5,946,641, issued Aug. 31, 1999 based on allowed U.S. application Ser. No. 08/876,419 filed Jun. 16, 1997 by J. L. Rourke, et al., originally filed as a provisional application on Oct. 18, 1996 (D/96509). The Canadian equivalent thereof was published on Apr. 18, 1998 as publication number 2215766. Said Rourke, et al. patent is also of interest for disclosing a queuing system examining document attributes and delivering one or more portions of the document to one or more document processing subsystems and then merging the document portions.. Other art is cited in both. Especially as to the latter, the Xerox Disclosure Journal publication, "Integration of Black Only and Color Printers" by Paul F. Morgan, Vol. 16, No. 6, pp. 381–383, November/December, 1991.

Of background interest as to tab printing in a network context, there is noted Xerox Corp. U.S. Pat. No. 5,946,461 to Landry et al.

By way of general background on printer jam detection and job recovery, there is noted, for example, Xerox Corp. U.S. Pat. Nos. 5,045,881; 4,231,547; and 5,179,410.

There are numerous background examples of many products and patents on electronic printing, print job queue management, and the like, including those cited above, such as said Rourke, et al., and other patents cited therein. Thus, electronic printing of electronic print jobs in general, as well as jam detection, job recover, collation, finishing and other aspects thereof, is well known in the art from these and many other patents and products. Accordingly, they need not be re-described herein for those skilled in the art.

By way of such background, it is well known that an electronic print job being electronically sent to a printer can automatically control the printer operation, including the selection of the print sheets for particular pages. It may include special sheet selections, along with the other document printing instructions, in one of the known page description languages (PDL), or other print job instructions. The print job may be sent directly or via an interconnecting separate or integral print server. Some commercial electronic printers allow additional such selections or additions to be made from the printer console or graphic user interface (GUI), or a "job ticket". The electronic print job may be sent directly from user terminals, or from electronic storage, typically over internal or external networks to which the printer is connected, which may also connect with the Internet. Typically the sent print jobs go into a print queue of print jobs in an assigned or selected printing order in the print server, which print order is usually determined by their document receipt order, and document page order, unless overridden is some manner.

Some further examples of prior patents relating to networked printers in network environments of plural remote terminal shared users include Xerox Corporation U.S. Pat. Nos. 4,453,128; 5,170,340; 5,226,112; 5,243,518; 5,287,194; EPO 0529818A3 pub. Mar. 3, 1993; and GB 2198566A pub. Jun. 15, 1988. Some patents on this subject by others include U.S. Pat. Nos. 4,623,244; 4,651,278; 4,760,458; 4,821,107; 4,903,229; 4,953,080; 5,113,355; 5,113,494; 5,181,162; 5,220,674; 5,247,670 and 5,371,837. Further by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Some of these patents also disclose "multifunction" machines, such as digital printer/scanner/facsimile/copier machines, and their controls.

It is also known to provide "job tickets" with page description language (PDL) or other print job instructions.

Cited merely as two examples are Xerox Corp. U.S. Pat. Nos. 5,467,434 and 5,493,634. Job tickets are printed sheets or cards with optically readable indicia code providing printing control instructions which can be inputted to the scanner of the printer, if it has one, or to a connected scanner.

Some historic network systems related publications include "Xerox Office Systems Technology . . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, a new personal computer . . . "; "Xerox System Integration Standard Printing Protocol XSIS 118404", April 1984; "Xerox Integrated Production Publishers Solutions: . . . " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress®: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Also noted by way of background as to commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet™"; and the Interpress Electronic Printing Standard, Version 3.0, Xerox System Integration Standard XNSS 048601 (January 1986). Also, the much earlier Xerox Corporation "9700™" electronic printing System"; the "VP Local Laser Printing" software application package, which, together with the Xerox "4045™" or other Laser Copier/Printer, the "6085™" "Professional Computer System" using Xerox Corporation "ViewPoint™" or "GlobalView™" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart"® digital printing systems, first announced Sep. 13, 1990, are also noted. Current popular commercial "systems software", including LAN workstation connections, is available from Novell®, Microsoft® Windows® and IBM OS/2®.

Disclosed in the embodiment herein is an improved system for printing electronic documents which call for printing jam-prone sheets. It can be implemented in software, using conventional hardware, to provide a low-cost and simple system, yet enhance overall productivity of the printer, and reduce paper waste.

A specific feature of the specific embodiment disclosed herein is to provide in a method of electronic collated printing of an electronic document of plural electronic pages onto printing sheets to provide collated print jobs, in a printing system capable of printing normal sheets with a normal jam rate, and capable of printing identifiable abnormal printing sheets with a substantially higher jam rate, and wherein associated with said one or more of said electronic document electronic pages is respective printing sheet selection information specifying the printing of said one or more identified pages of said plural page electronic document onto one or more of said abnormal printing sheets having a substantially higher jam rate; the improvement comprising: electronically separating from other said electronic pages of said electronic document, said electronic pages of said plural page electronic document which have said associated sheet selection information specifying printing those pages onto said abnormal printing sheets having a substantially higher jam rate: printing said separated electronic pages specifying printing onto said abnormal printing sheets prior to printing said other electronic pages of said electronic document; temporarily holding said printed abnormal printing sheets; printing said other said electronic pages of said electronic document and providing collated merging of said previously printed abnormal printing sheets therein as said other electronic pages are being printed, to provide collated output of one or more collated printed sets of said entire plural page electronic document at an output location.

Further specific features disclosed in the embodiment herein, individually or in combination, include those wherein said other electronic pages of said electronic document are pages which are electronically designated with sheet selection information specifying their printing on said normal printing sheets having said normal printing jam rate; and/or wherein said temporary holding of said abnormal printing sheets having a substantially higher jam rate is provided by an interposer, and wherein said interposer also provides said collated merging of said abnormal printed sheets with said other printing sheets printed with said other electronic pages of said electronic document; and/or in an electronic printing system with a printing apparatus capable of printing normal printing sheets with a normal jam rate and certain abnormal sheets with a substantially higher jam rate, said printing apparatus having an associated electronic document processing input for receiving and electronically processing plural page electronic documents to be printed by said printing apparatus and controlling their printing, said electronic document processing input being adapted to identify printing sheet selection information associated with said electronic pages of said electronic document for selecting the printing of selected pages of said plural page electronic document onto selected said normal or abnormal printing sheets, and wherein said electronic document processing input for said printer includes a page printing queuing system for controlling the printing order of said electronic pages of said electronic document, the improvement wherein: said electronic document processing input is programmed to electronically separate those said electronic pages of said electronic document which have said sheet selection information specifying printing of said pages onto said abnormal printing sheets having a higher jam rate, so as to be separated from other electronic pages of said electronic document selecting printing said other pages onto said normal printing sheets, said electronic document processing input being further programmed to print said separated electronic pages onto said abnormal printing sheets prior to printing said other electronic pages of said electronic document, and to temporarily delay printing of said other electronic pages of said electronic document; a sheet holding system for temporarily holding said printed abnormal printing sheets, said electronic document input being further programmed to feed said printed abnormal printing sheets into said sheet holding system, and then initiate the printing of said other pages of said electronic document; a sheet collating system for merging said printed abnormal printing sheets in said holding system with said subsequently printed other electronic pages of said electronic document as said other electronic pages of said electronic document are being printed; and an output system for collecting completed collated printed pages of all of the pages of said electronic document; and/or wherein said sheet holding system for temporarily holding said abnormal printing sheets, and said collating system for merging said abnormal printing sheets into said other printed electronic pages of said electronic document as they are being printed, comprises an interposer; and/or wherein said delaying printing of said other electronic pages of said electronic document is provided in said page printing queuing system.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

It is well known that the control of document and copy sheet handling systems may be accomplished by conventionally actuating them with signals from a microprocessor controller directly or indirectly in response to simple programmed commands. The resultant controller signals may conventionally actuate various conventional electrical solenoid or cam-controlled sheet deflector fingers, motors or clutches, or other components, in programmed steps or sequences. Conventional sheet path sensors or switches connected to the controller may be utilized for sensing, counting, and timing the positions of sheets in the sheet paths of the reproduction apparatus, and thereby also controlling the operation of sheet feeders and gates, etc., as is well known in the art.

In the description herein the term "sheet" refers to a usually flimsy physical sheet of paper, plastic, or other suitable physical substrate for images, whether precut or initially web fed. A "copy sheet" may be abbreviated as a "copy", or called a "hardcopy". A "job" is normally a set of related sheets, usually a collated copy set copied from a set of original document sheets or electronic document page images, from a particular user, or otherwise related. A "simplex" document or copy sheet is one having its image and any page number on only one side or face of the sheet, whereas a "duplex" document or copy sheet has "pages", and normally images, on both sides, i. e., each duplex sheet is considered to have two opposing sides or "pages" even though no physical page number may be present.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
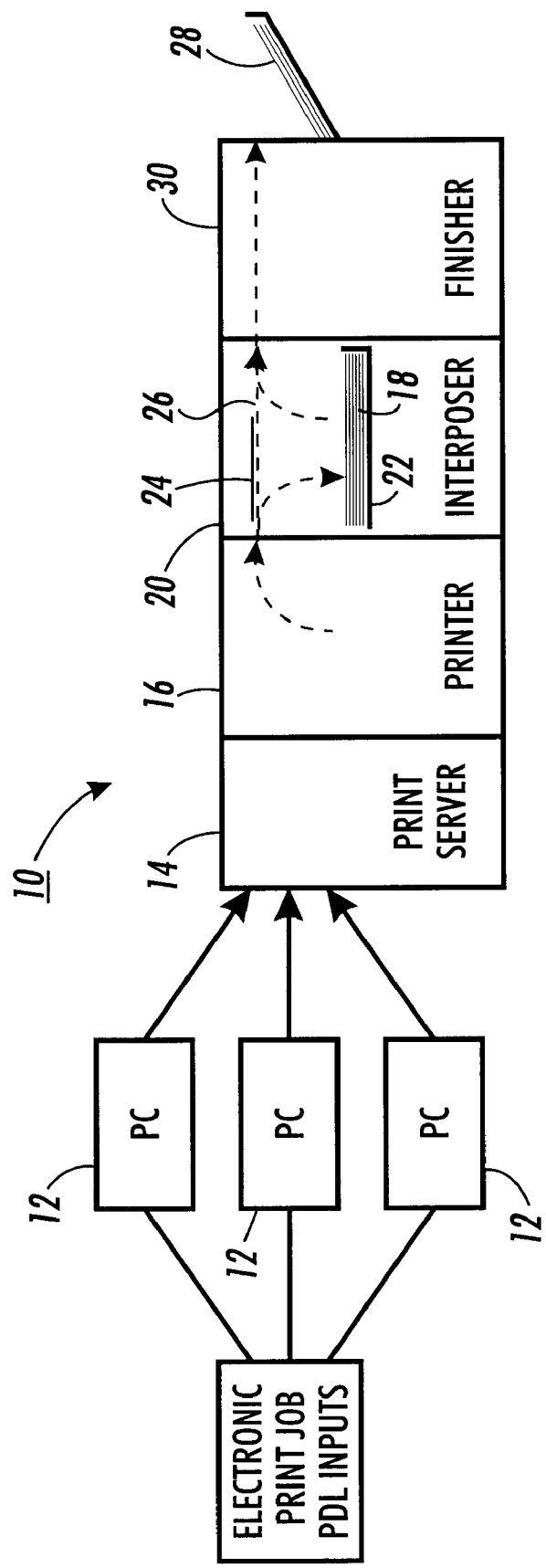

Various of the above-mentioned and further features and advantages will be apparent from the specific apparatus and its operation described in the example below, and the claims. Thus, the present invention will be better understood from this description of a specific embodiment, including the drawing figures wherein:

FIG. 1 is a flowchart of one example of an improved printing system and method in accordance with the present invention; and FIG. 2 is a schematic frontal view of one embodiment or application of the disclosed system.

Describing now in further detail the exemplary embodiment with reference to the Figures, there is shown in FIG. 2 schematically a conventional electronic printer reproduction machine system 10 and its electronic documents input, by way of one example thereof, in which plural user terminals 12 can conventionally electronically input electronic print jobs to a print server 14 for a printer print engine 16. The printer print engine 16 is shown first printing and outputting jam-prone printed sheets 18 to stack in a conventional interposer 20 tray 22, and then printing and outputting normal printed sheets 24 which pass through interposer 20 bypass path 26 where the sheets 18 are merged with the print stream of sheets 24 by the interposer 20 in a known manner in page order. That is, with sheets 18 fed out of tray 22 at the correct times to provide collated output document sets 28 at the conventional output/finisher 30. All of this is well known to those in the art, as demonstrated by the above-cited and other art, and need not be re-described in any further detail here.

Turning now to the flowchart example of FIG. 1, the steps and operations are fully self-explained, with time-lines. That is, the horizontal dashed lines showing the relatives times or periods in which the process steps occur from top to bottom in FIG. 2.

In this disclosed embodiment, as an electronic print job comes in to the print server 14 for the electronic printer 16 for printing, the more jam prone sheet requiring pages of that print job document may be electronically identified and electronically separated or "pulled" from the normal print order print queue. Those special, more jam-prone, pages may be identified from the job ticket, PDL, or other special print stock instructions or indicia. Or, in some cases, they may be identified from a paper supply drawer designator (of a drawer in which special paper or card stock is loaded). These automatically electronically pulled jam prone pages are then printed first, out of order. These special printed sheets 18 are fed into an interposer 20 intermediate tray 22 (intermediate the printer output) to be held for subsequent insertion. Thus, if a jam occurs due to a special sheet printing jam, only some of these special sheets need to be purged and reprinted, not the entire, or a large proportion of, the multi-page document set or sets. Then, after the jam-prone sheets 18 have been printed and stored in the interposer 20, the rest of that same print job, which is much less jam prone, is printed. That is, the delayed printing of the text pages to be printed on standard weight, standard size, paper 24, now start to be printed, and collation is re-established (to provide complete collated sets of the print job) by interposing (inserting) the previously printed sheets 18 from the interposer tray 22 into the print job stream of the printer at the page positions from which they were previously electronically removed, so that properly collated complete print job documents 28 may thus be normally sent on for output and/or finishing 30.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a method of electronic collated printing of an electronic document of plural electronic pages onto printing sheets to provide collated print jobs, in a printing system capable of printing normal sheets with a normal jam rate, and capable of printing identifiable abnormal printing sheets with a substantially higher jam rate, and wherein associated with said one or more of said electronic document electronic pages is respective printing sheet selection information specifying the printing of said one or more identified pages of said plural page electronic document onto one or more of said abnormal printing sheets having a substantially higher jam rate; the improvement comprising:

electronically separating from other said electronic pages of said electronic document, said electronic pages of said plural page electronic document which have said associated sheet selection information specifying printing those pages onto said abnormal printing sheets having a substantially higher jam rate:

printing said separated electronic pages specifying printing onto said abnormal printing sheets prior to printing said other electronic pages of said electronic document;

temporarily holding said printed abnormal printing sheets;

printing said other said electronic pages of said electronic document and providing collated merging of said previously printed abnormal printing sheets therein as said other electronic pages are being printed, to provide collated output of one or more collated printed sets of said entire plural page electronic document at an output location.

2. The method of electronic collated printing of an electronic document of claim 1, wherein said other electronic pages of said electronic document are pages which are electronically designated with sheet selection information specifying their printing on said normal printing sheets having said normal printing jam rate.

3. The method of electronic collated printing of an electronic document of claim 1, wherein said temporary holding of said abnormal printing sheets having a substantially higher jam rate is provided by an interposer, and wherein said interposer also provides said collated merging of said abnormal printed sheets with said other printing sheets printed with said other electronic pages of said electronic document.

4. In an electronic printing system with a printing apparatus capable of printing normal printing sheets with a normal jam rate and certain abnormal sheets with a substantially higher jam rate, said printing apparatus having an associated electronic document processing input for receiving and electronically processing plural page electronic documents to be printed by said printing apparatus and controlling their printing, said electronic document processing input being adapted to identify printing sheet selection information associated with said electronic pages of said electronic document for selecting the printing of selected pages of said plural page electronic document onto selected said normal or abnormal printing sheets, and wherein said electronic document processing input for said printer includes a page printing queuing system for controlling the printing order of said electronic pages of said electronic document, the improvement wherein:

said electronic document processing input is programmed to electronically separate those said electronic pages of said electronic document which have said sheet selection information specifying printing of said pages onto said abnormal printing sheets having a higher jam rate, so as to be separated from other electronic pages of said electronic document selecting printing said other pages onto said normal printing sheets, said electronic document processing input being further programmed to print said separated electronic pages onto said abnormal printing sheets prior to printing said other electronic pages of said electronic document, and to temporarily delay printing of said other electronic pages of said electronic document;

a sheet holding system for temporarily holding said printed abnormal printing sheets, said electronic document input being further programmed to feed said printed abnormal printing sheets into said sheet holding system, and then initiate the printing of said other pages of said electronic document;

a sheet collating system for merging said printed abnormal printing sheets in said holding system with said subsequently printed other electronic pages of said electronic document as said other electronic pages of said electronic document are being printed; and an output system for collecting completed collated printed pages of all of the pages of said electronic document.

5. The electronic printing system of claim 1, wherein said sheet holding system for temporarily holding said abnormal printing sheets, and said collating system for merging said abnormal printing sheets into said other printed electronic pages of said electronic document as they are being printed, comprises an interposer.

6. The electronic printing system of claim 1, wherein said delaying printing of said other electronic pages of said electronic document is provided in said page printing queuing system.

* * * * *